United States Patent Office 3,070,405
Patented Dec. 25, 1962

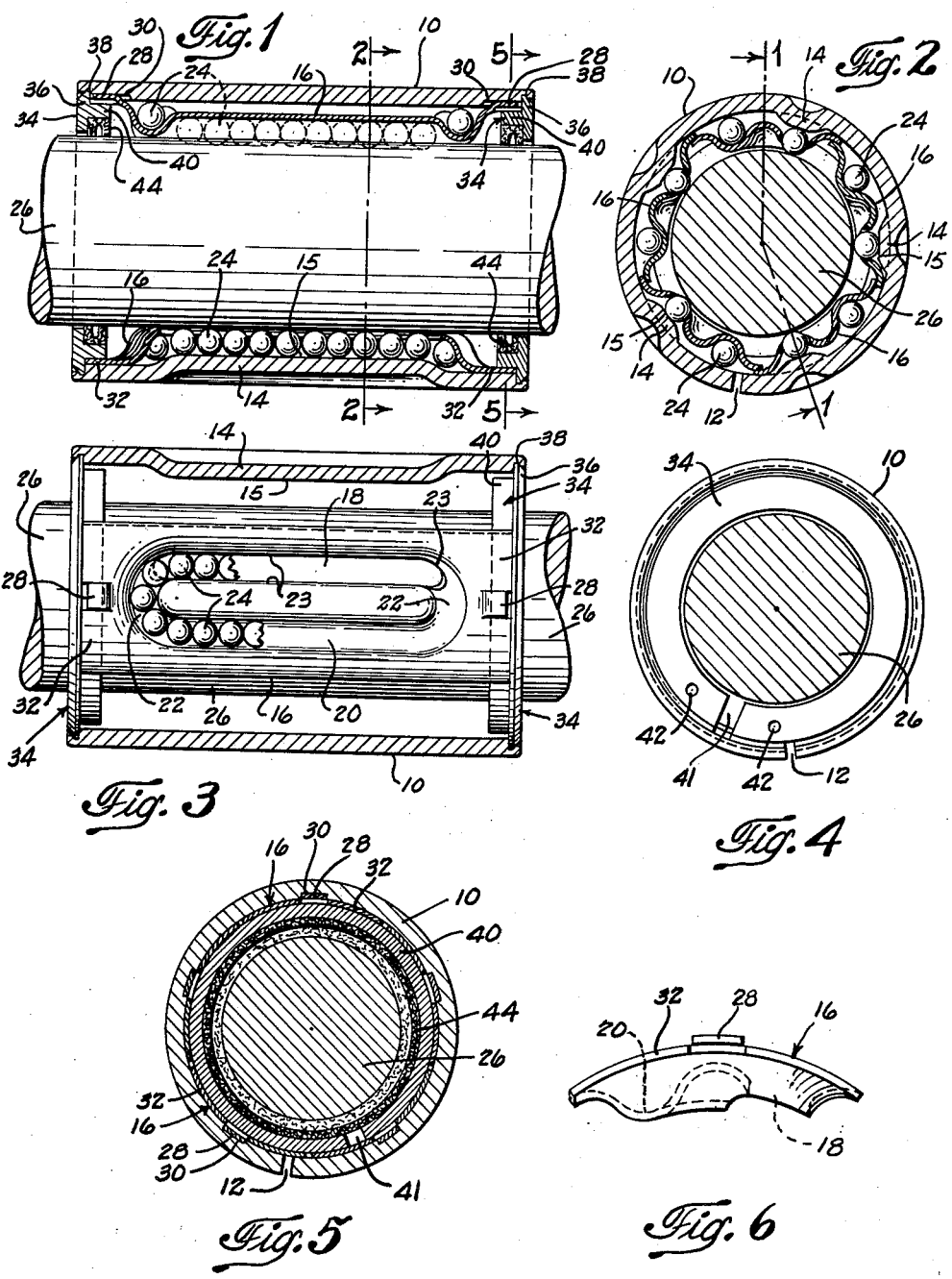

3,070,405
BALL TYPE BEARING FOR LINEAR MOTION
Karl Hülck, Bad Kissingen, and Emil Menninger, Schweinfurt, Germany, assignors to John B. Thomson, Manhasset, N.Y.
Filed Dec. 10, 1959, Ser. No. 858,724
5 Claims. (Cl. 308—6)

This invention relates generally to bearings of the low friction type for providing linear motion along a shaft and has particular relation to an improved ball bearing of this type and which is of a simplified construction.

Objects and advantages of the invention will be obvious herefrom, or may be learned by practice with the invention, the same being realized and attained by means of the instrumentalities and combinations pointed out in the appended claims.

The present invention has for an object an improved ball bearing of simplified construction for low friction travel linearly along a shaft. A further object is to provide such a bearing that is made of a number of separate elements each of which may be fabricated by simple and inexpensive manufacturing processes and which are assembled and retained in operative relation in an extremely simple manner. Another object is the provision of such an improved bearing which may be readily assembled and disassembled without the use of presses and the like equipment and wherein the various elements are positively oriented in their correct operative relation during the assembly process. Still another object is the provision of such an improved bearing which although of simple construction and extremely easy to assemble and disassemble so that it is of very low cost, is highly reliable and satisfactory in operation.

In accordance with the invention the linear motion ball bearing includes a cylindrical housing member that is preferably longitudinally split and of thin wall construction so that it may be fabricated from tubular stock or plate material which is suitably formed into the cylindrical configuration desired. This housing has a plurality of circumferentially spaced longitudinally extending and radially inwardly deformed portions which provide bearing surfaces or working tracks. Within the housing is provided a number of longitudinally extending ball race segments which extend generally throughout the length of the housing and have formed in them an oblong continuous race that is made up of two straight portions parallel with the axis of the housing and interconnected at their ends by curved portions. One of these straight portions in each of the segments is radially opposite a bearing surface formed on the housing with balls being provided in each of the raceways and the balls being in load bearing engagement with the bearing surface formed on the housing and surface of a shaft received within the segments with the raceway disposed radially opposite the housing bearing surface being slotted for this purpose, and with the balls traveling freely throughout the remaining portion of the endless raceway providing no load carrying function during their traversal of this remaining portion. These segments are arcuately formed generally in conformance with the housing and each end of the segments is provided with an arcuate portion or lip that engages and conforms with the inner wall surface of the housing. The segments are oriented in their proper position within the housing by an indexing means which takes the form of a radially outward projecting tab or boss that is provided on each of the arcuate end portions of the segments and which is received in a complementary recess or groove provided in the wall of the housing. The various segments are retained in their proper and assembled relation within the housing by means of expanded retaining rings which are preferably split and resilient. The rings are expanded into the ends of the housing and may be retained in position in the housing by means of internested radial flanges and grooves provided in the rings and housing, respectively. The ring is preferably urged radially outward into its engaged position with the housing by means of its own resilience and may be contracted to a sufficiently small diameter so that it may be readily removed from the housing when desired. A lubricating seal ring is mounted in a suitable radial recess provided in the retaining ring with the seal ring being of resilient material and having for its purpose the retention of lubricant within the bearing.

The invention consists in the novel parts, constructions, arrangements, combinations and improvements herein shown and described.

The accompanying drawings, referred to herein and constituting a part hereof, illustrate the preferred embodiment of the invention and together with the description, serve to explain the principles of the invention.

FIGURE 1 is a longitudinal sectional view of the bearing of the invention and is taken generally along line 1—1 of FIGURE 2;

FIGURE 2 is a transverse sectional view of the bearing with this figure being taken along line 2—2 of FIGURE 1;

FIGURE 3 is a view showing the housing of the bearing broken away with one of the ball race members or segments disposed in its operative position;

FIGURE 4 is an end view of the bearing;

FIGURE 5 is a transverse sectional view taken along line 5—5 of FIGURE 1; and,

FIGURE 6 is an end elevational view of one of the ball race segments per se.

Referring now to the drawings, wherein like reference characters are used throughout to designate like elements, the illustrative and preferred embodiment of the invention depicted therein includes housing 10 which is cylindrical in form and of relatively thin walls whereby the housing may advantageously be formed of plate or sheet material which may be bent or rolled into the desired cylindrical configuration or alternatively the housing may be formed from tubular material with the housing, preferably being longitudinally split as indicated by the longitudinal passage 12. The housing is provided with a number (five in the illustrative embodiment) of radially inwardly projecting longitudinally extending portions 14 with these portions extending less than the full longitudinal distance or length of the housing, being centered between the ends of the housing, and with the inner surface of these portions providing bearing surfaces or working tracks 15.

Disposed about the inner surface of the housing are a plurality of ball race members or segments identified generally as 16. These segments are made of sheet metal so that they may be readily formed by stamping or a similar process and each of these segments is provided with a continuous oblong outwardly facing ball raceway or circuit within which balls are retained and around which the balls move during linear movement of the bearing relative to a shaft. This raceway is made up of two straight portions 18 and 20 (FIGURE 3) which are interconnected at their ends by curved portions 22 and the raceway is filled with balls 24. In each of the segments 16 the straight portion 18 of the continuous raceway is positioned immediately radially inward of one of the indented or inwardly projecting portions 14 of the housing 10 and this straight portion 18 is provided with a slot 23 generally throughout its length whereby the balls 24 may be in load bearing relation with shaft 26 and the bearing surface 15 formed by the indented portion 14. This portion 14 tapers radially outward adjacent each end of the straight portion 18 of the raceway and slot 23 tapers at each end of this straight raceway portion as shown in FIGURE 3 so that the balls are gradually lifted from and deposited in the slot during their continuous movement around the raceway.

The several ball race members or segments 16 are symmetrically disposed about the inner surface of housing 10 with the segments being generally arcuate in configuration and with the adjacent edges of the segments overlapping as disclosed in FIGURE 2.

It is, of course, essential that each of the segments 16 be properly oriented within housing 10 and retained in its operative position within the housing with this position being such that the straight raceway portion 18 is disposed immediately radially inward of the inwardly extending portions 14. This proper orientation of the segments is assured by an indexing arrangement which takes the form of radially extending tab or boss 28 formed at each end of each segment and which is received in a complementary recess 30 in housing 10. The boss 28 is stamped or otherwise formed from the arcuate lip or portion 32 formed at each end of each segment with these arcuate portions of the segments being disposed radially outward with respect to the remainder of the segment and being in conforming and overlying relation with the inner surface of housing 10 and with the arcuate portions 32 of the several segments being circumferentially disposed in side by side relation.

The segments are retained within housing 10 by means of split rings 34 which are preferably resilient and are releasably retained within the housing at each end thereof adjacent the ends of the segments. Each of the rings 34 is generally T-shaped in transverse configuration having a radially outwardly extending flange 36 which is received within a complementary recess in the inner surface of housing 10 with this recess being identified as 38. The flange 36 and recess 38 are provided with engaging tapered surfaces, as shown, which urge the ring inwardly of the housing into an abutting relation with a radial flange or surface that faces outwardly and that forms a part of recess 38. The inwardly extending portion 40 of each of the split rings provides an outwardly facing shoulder which underlies and engages the arcuate lips 32 of segments 16 forcing these lips into engagement with the inner surface of housing 10 and firmly clamping the lips between the ring and the housing and accordingly retaining tab 28 within its complementary recess in the housing. The split rings 34 are urged by their own resilience into their operative position in engagement with the housing 10, and with flange 36 being internested in recess 38 when in this position, and with the ends of the ring being then separated by the space identified as 41 in FIGURES 4 and 5. The rings may be readily contracted the circumferential extent of this space with this being sufficient to decrease the diameter of the rings so that they may be removed from the housing. Each of the rings is provided with a shallow recess 42 adjacent each end for reception of a tool, that may be in the nature of a pair of pliers, for contracting the ring for removal from the housing.

The bearing normally is lubricated and in order to retain the lubricant within the bearing each of the rings 34 is provided with an annular seal 44 snugly fitted within the inwardly facing recess provided in the ring with this seal engaging the surface of shaft 26 and preventing the leakage of lubricant from within the bearing.

It will thus be seen that with the present invention an extremely simply constructed bearing is provided which is very easy to assemble. In assembling the bearing the segments 16 may be positioned within the housing one at a time with the segments being disposed in their indexed, operative position in the housing first so the raceway faces upwardly with the housing, whose axis is in a horizontal position, then being rotated sufficiently for insertion of the next segment. In this manner the balls will not be lost from the raceways. After each of the segments is positioned in its proper position within the housing, one of the split rings may be snapped into its operative position while the segments are retained in their proper relation through access from the other end of the housing. After positioning one of the split rings in its proper position the other split ring may then readily be assembled into its proper and operative relation, with the bearing then being completely assembled. If it is necessary to disassemble the bearing for any reason, it is only required that the split rings be contracted and removed after which the segments may then be removed with the bearing then being completely disassembled.

It will be appreciated that the facility with which the bearing may be assembled and disassembled substantially reduces manufacturing and servicing costs whereby an extremely simple, economic bearing is provided and which may be readily serviced if necessary.

The invention in its broader aspects is not limited to the specific mechanism shown and described but departures may be made therefrom, within the scope of the accompanying claims, without departing from the principles of the invention and without sacrificing its chief advantages.

What is claimed is:

1. An anti-friction linear bearing comprising a sleeve, a plurality of ball race members disposed within said sleeve, each of said ball race members having a raceway with balls therein, said ball race means and sleeve having interfitting indexing means comprising interengaging projections and recesses for preventing peripheral displacement of said members in said sleeve and retaining elements at each end of said sleeve cooperating with said ball race means to normally maintain said projections in said recesses and hold said members in said sleeve in an assembled relationship.

2. The invention as defined in claim 1 wherein each of said retaining elements is radially expandable for ready insertion and removal from position at each end of said sleeve.

3. The invention as defined in claim 1 wherein said index means includes a boss and slot arrangement at each end of said ball race means and between said ball race members and said sleeve.

4. A linear motion bearing comprising a housing having a passage therein, a plurality of ball race members disposed contiguously about the inner surface of said passage and each of which has an oblong endless raceway therein with balls in said raceway, means for retaining said members within said passage in said housing including an outwardly expanding ring adjacent each end of said members, means mounting said rings in spaced axial disposition within said housing for maintaining said members therebetween, and means for retaining said members in contiguous registered relationship within said housing, said retaining means including portions of each of said members interfitting with cooperating sections of said housing and effective to index said members in position in said housing, preventing circumferential displacement thereof within said housing.

5. The invention as defined in claim 4 including a shoulder formed on each of said rings and adapted to engage said ball race members adjacent the ends thereof to resiliently urge said interfitting portions of said members into their cooperating sections of said housing.

References Cited in the file of this patent

UNITED STATES PATENTS 2,907,610    Wise                 Oct. 6, 1959

OTHER REFERENCES

Catalog by Thomson Industries Inc., pages 1 through 5 relied upon, received in Patent Office October 14, 1958.